United States Patent Office 3,684,579
Patented Aug. 15, 1972

3,684,579
METHOD OF PRODUCING A TUNGSTEN CARBIDE CONTAINING ELECTRODE FOR FUEL ELEMENTS
Konrad Mund, Heuschlag 20, and Rolf-Winfried Schulte, Lonsweg 3, both of Erlangen, Germany
Filed July 21, 1970, Ser. No. 56,772
Claims priority, application Germany, Aug. 1, 1969, P 19 39 127.6
Int. Cl. H01m 13/04
U.S. Cl. 136—120 FC  13 Claims

ABSTRACT OF THE DISCLOSURE

Process for making a WC containing electrode for fuel cell elements. A silver tungstate is reduced at elevated temperature in a hydrogen atmosphere. It is thereafter carburated. Finally, an electrode is formed of the thus produced silver containing tungsten carbide.

---

Our invention relates to an improved method for producing tungsten carbide containing electrodes for fuel cell elements with acid electrolyte, as well as to the electrode produced by the method.

According to German published application No. 1,496,176 and the method it describes, electrodes which contain, among others, tungsten carbide may be produced by reacting on the surface of a porous electrode body of a non-conductive, semiconductive or conductive material, a readily volatile carbon compound with a readily volatile compound of tungsten, preferably a tungsten halide, in a reduced atmosphere, at sufficiently high temperature. Electrodes thus produced are still unsatisfactory with respect to their catalytical activity. For economical as well as for technical reasons, it is necessary to increase the output density still further in fuel elements with acid electrolyte.

An object of our invention is to provide an improved method for producing electrodes containing tungsten carbide which can considerably improve the output or power density of the electrodes in fuel elements.

Our invention is based on the recognition that the power density of electrodes depends not only on the composition of the catalyst but also to a large degree upon the size and structure of the catalyst grains. We obtain our improved electrode by first reducing the silver salt of a tungstic acid at high temperatures, in a hydrogen atmosphere and subsequently to carburete it to form a silver containing tungsten carbide. We produce the electrode therefrom.

It is preferred to start with the silver salt of metatungstic acid. The production of the electrode from the silver containing tungsten carbide is preferably effected through a sedimentation of the tungsten carbide on a diaphragm or by pressing and/or sintering the tungsten carbide, if necessary, in the presence of a binder.

The reduction of the tungstic acid to metallic tungsten, in a hydrogen atmosphere, at temperatures between 500 and 700° C., as well as the subsequent carburetion of the tungsten are no longer novel. However, when tungstic acid of formula $H_2WO_4$ is heated in a hydrogen current first to 500° C. and subsequently to 700° C., i.e. when the tungstic acid is first reduced to tungsten dioxide and then to metal, the carburetion by means of carbon monoxide or methane will produce a fine powdered tungsten carbide (the particle diameter is between 1 and $2\mu$) with BET-face between 2 and 30 m.²/g. However, the electrodes produced from such tungsten carbide powders will have no increased catalytical activity over the tungsten carbide electrodes, produced according to the known method.

Therefore, it could not have been foreseen that catalysts can be produced from the silver salts of the tungsten acids by reduction and carburetion, whose activity is increased and whose workability is good. It also could not have been foreseen that electrodes produced from such catalyst material provide, event with a small amount per surface unit, improved characteristics relative to the prior art, for the hydrogen oxidation, in the acid electrolyte.

According to the invention, all silver salts of the tungstic acids can be employed, such as, e.g. $Ag_2WO_4$ (silver-monotungstate), $Ag_2W_4O_{13} \cdot 3H_2O$ (silver metatungstate) or $Ag_{10}W_{12}O_{41}$ (paratungstate), however, according to a preferred embodiment silver metatungstate is used as the original material. The indicated formulas show that the share of the silver in silver tungsten carbide depends upon the silver tungstate used and that the silver content may be adjusted to the desired electrode structure, to an optimum degree.

The production of silver salts is best effected in a known manner, through precipitation from an aqueous solution of the salt of a tungsten acid, preferably from a sodium salt solution by a silver nitrate solution. Other soluble silver salts may naturally also be used, for example silver acetate, in place of the silver nitrate.

The precipitation of the silver salts can be effected at room temperature as well as at elevated temperatures. The use of elevated precipitation temperatures is preferred, when silver compounds with a high particle diameter are desired. Thus, for example silver metatungstate is preferably precipitated with $AgNO_3$ at temperatures ranging between 40 to 80° C.

The washed and dried silver tungstate may be reduced in a hydrogen current in one or two steps. The step wise reduction is especially preferred. The temperature applied in the first step is between 400 and 600° C., particularly around 500° C. and that of the second stage is between 600 and 800° C., particularly at approximately 700° C. if the reduction is to be carried out in a single step, a higher temperature may be adjusted at once, favorably at 650 to 750° C. Thereafter, the carburetion is performed with a carbon containing, preferably gaseous, compound such as carbonmonoxide and methane. The carburating temperature is between 800 and 1000° C., particularly 830 to 900° C.

It was further found that the structure of the catalyst grains changes during reduction and carburetion only to a small degree, so that, possibly, the catalyst material having the desired grain size and shape may be selected following the precipitation of the silver salt, for example, through sizing.

Figure 1:
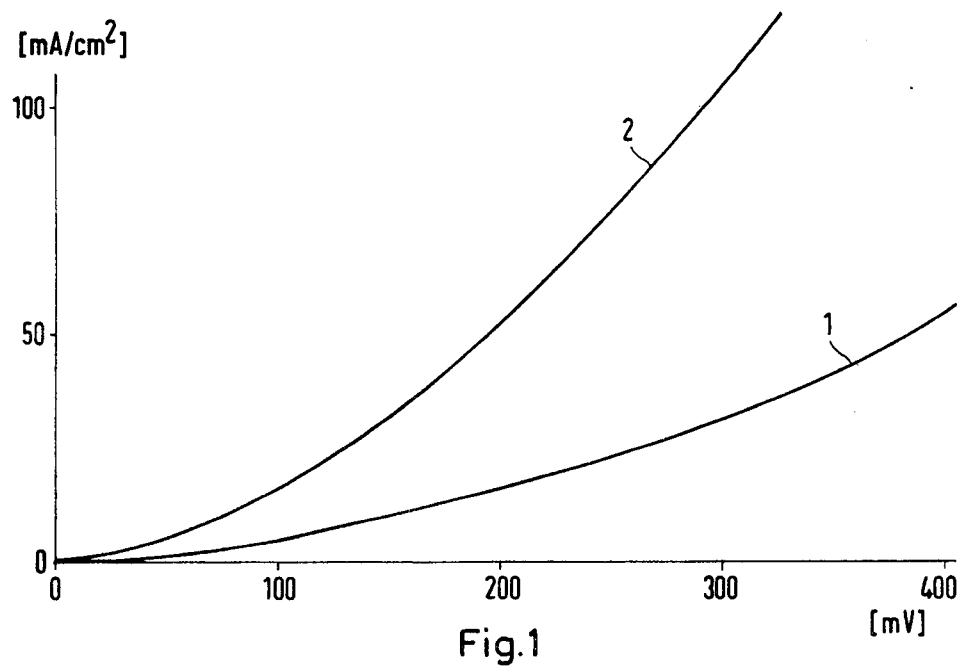
FIGS. 1 and 2 are explanatory graphs.

The following examples, with reference to the drawings, will serve to explain the object of the invention even in greater detail.

EXAMPLE 1

(a) Production of sodium metatungstate
$Na_2O \cdot 4WO_3 (NA_2W_4O_{13})$ 300 g. $Na_2WO_4 \cdot 2H_2O$ were dissolved in 3000 ml. $H_2O$. 800 g. $H_2WO_4$ were added to the solution. The suspension was boiled for 3 hours. After the precipitate settled, the supernatent solution was discanted and the rest of the suspension filtered. The combined solutions were reduced, on a sand bath, until almost dry. Drying via concentrated sulfuric acid produces anhydrous sodium metatungstate.

(b) Production of silver metatungstate
$Ag_2O \cdot 4WO_3 \cdot 3H_2O$ 50 g. of $Na_2O \cdot 4WO_3$ were dissolved in 65 ml. $H_2O$. The equivalent amount of 17.15 g. $AgNO_3$ were dissolved in 25 ml. $H_2O$. The sodium metatungstate solution was heated in an oil bath to 85 to 100° C., whereupon by mixing with an electric mixer and under elimination of light, cold silver nitrate solution was continuouly added, dropwise, from a burette, for about 3 minutes. After the precipitation was completed, the precipitate was left to crystallize for three days, in a dark location. Thereafter, it was separated from the solution, by centrifugal means, washed twice with $H_2O$ and centrifugally separated from the wash water each time. The obtained salt is dried in a drier at 100° C., for one hour.

(c) The production of the Ag-WC catalyst

To produce the catalyst, 6 to 10 g. silver metatungstate, which were previously pulverized in a mortar, were sieved through a mesh width of 100μ and placed in approximately 1-2 mm. high layers, into a quartz boat which was then inserted into a quartz tube, located in a furnace. After the air in the tube was expelled, the tube and contents were raised to 700° C. within 25 minutes with a hydrogen flow of 2 l./min. The temperature was maintained, for 6 hours, for reduction. To adjust the flow velocity, it is preferred to use a gas clock which is switched in series with the tube. After completing the reduction, the furnace was disconnected, immediately opened and the tube removed therefrom and cooled with a blower in 10 to 20 min. to room temperature. The hydrogen flow rate was reduced to 1 l./min. and the arrangement left standing over night. The next day, the tube was placed again into the furnace and the substance was heated within 40 min. to 860° C. in a hydrogen current. Now a switch from hydrogen and carbon-oxide took place. A CO flow velocity of 2 l./min. was established and the temperature was maintained for 3.5 hours. After the furnace was disconnected, the tube was removed from the furnace and cooled at room temperature, with a blower. After 10 to 20 min. the carbon monoxide current may be discontinued and the catalyst may be removed from the tube. The fractionization of the catalyst took place by a sieve, with a mesh width of 100μ.

(d) The characteristics of the obtained catalyst

The evaluation of the characteristics takes place in the known half-cell arrangement according to the principle of the supported electrode. 200 mg./cm.² of the obtained Ag-WC powder were deposited by sedimentation upon an asbestos paper cover layer (diaphragm) or pasted thereon. A perforated sheet of tantalum and a PVC diaphragm supported the asbestos paper cover layer. The contacting and holding of the powder is effected with a carbon netting and with a gold dated tantalum perforated sheet.

FIG. 1 shows the characteristic assumed in 1 M $H_2SO_4$ at a hydrogen pressure of 1.0 atg. and at temperatures of 22 and 61° C. The ordinate shows the current density while the abscissa, the potential measured, relative to a reversible hydrogen electrode. Curve 1 shows the values at 22° C. and curve 2 shows the values at 61° C. The I.R.-drop is not shown in these curves.

EXAMPLE 2

(a) Production of the tungsten carbide WC

The starting material used here was tungsten acid of formula $H_2WO_4$. Then 300 g. of the acid were placed in a thin layer into a quartz boat, and reduced in a known manner, in a hydrogen current within a quartz tube, namely first for 5 hours at 500° C. and subsequently for 5 hours at 700° C. The acid was thereby reduced during the first step into $WO_2$ and in the second step, into tungsten metal. After the reduction was completed, carbon monoxide, rather than hydrogen, was passed through the quartz tube and the furnace was heated for 6 hours to 860° C. Thereafter the furnace was opened and the tube cooled, the CO current may be discontinued and the catalyst removed. Finally, the catalyst was sifted with the aid of a sieve with a mesh width of 100μ.

(b) Production of an electrode

A portion of the catalyst was applied, as shown in Example 1 as a thin powder layer upon an asbestos paper cover layer (diaphragm), through sedimentation.

To this end it was found most beneficial to treat the catalyst prior to sedimentation, first in an electrolyte, with ultrasonics in order to separate the individual particles from each other thereby making the wetting easier. The cover layer was supported on the electrolyte side through a tantalum perforated sheet and a porous PVC wafer. On the gas side, as shown in the aforegoing example, a carbon netting function and another perforated tantalum sheet, for holding and contacting the catalyst powder.

The determination of the characteristics was effected in a half-cell arrangement, according to Example 1.

Figure 2:
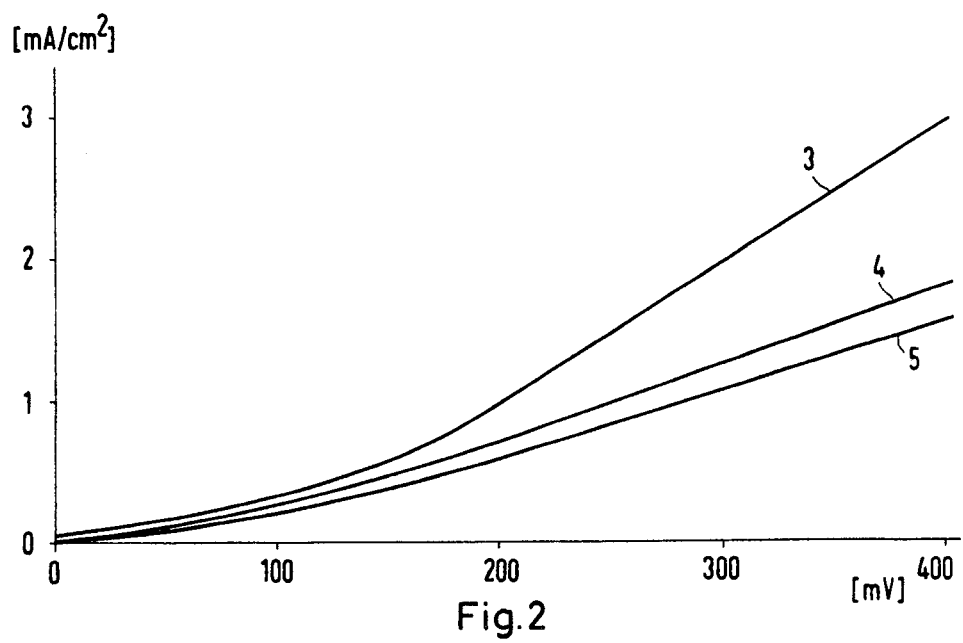

FIG. 2 shows curves 3, 4 and 5 obtained for various surface coatings in 1 M $H_2SO_4$, as an electrolyte, at 24° C. and 1.5 atg. $H_2$ pressure, whereby again, the current density is plotted on the ordinate and on the abscissa, the potential against a reversible hydrogen electrode. In the tests of the electrode shown in curve 3, the amount of catalyst was 10 mg./cm.², in curve 4 it was 20 mg./cm.² and in curve 5, 40 mg./cm.².

The measured quantities in FIG. 2, shows that electrodes can only be charged with a current density of 1.9 ma./cm.² at a polarization of 300 mv. and a catalyst amount of 10 mg./cm.². The permissible current density drops when the amount of catalysts was doubled, to about ⅓, and when it was multiplied to about half of the first-mentioned value. Accordingly, in 1 M $H_2SO_4$ at a polarization of 300 mv., a current density of 1.9 ma./cm.² already represents an optimum value and is not interesting for a practical utilization.

If, however, the pure tungsten carbide is replaced by silver containing tungsten carbide as the electrochemical catalyst then, due to the better grain structure, the amount of catalysts can be considerably increased without a detrimental affect upon the pore structure. Thus, current densities are obtained, at 22° C. in 1 M $H_2SO_4$ at a catalyst amount of 200 mg./cm.² and a polarization of 300 mv., which amount to 32 ma./cm.² and at 61° C. even 105 ma./cm.², i.e. with the aid of the new catalysts according to the invention, the current density may be raised at room temperature to almost 20 times the value of tungsten carbide.

Figure 3:
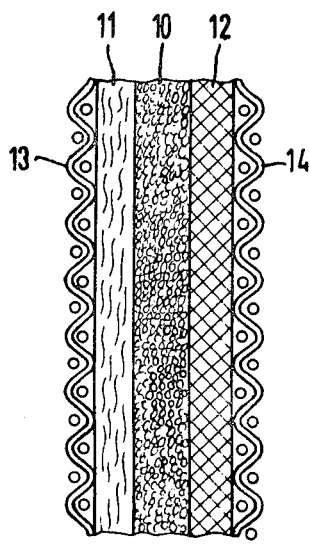
FIG. 3 is an electrode produced according to the invention.

FIG. 3 is a schematic illustration of an electrode which, as an electrochemical catalyst, contains silver containing tungsten carbide, in powder form. The pulverulent tungsten carbide layer 10 is supported on the electrolyte side by an asbestos paper cover layer 11 and on the gas side by a carbon mesh 12. For further support, metal nets or screens 13 and 14, may be provided when the electrode is operated in a fuel element.

In summary, it needs to be pointed out that the new catalyst material is not limited to pulverulent electrodes. The silver containing tungsten carbide may naturally also be used in a sintered and/or pressed form, whereby the use of a suitable, additional binder may be of advantage.

We claim:

1. A process for the production of a tungsten carbide containing electrode for fuel cell elements, which comprises reducing a silver salt of a tungstic acid at elevated temperatures in a hydrogen atmosphere to form a reduced product, carbureting said reduced product to form silver containing tungsten carbide, and forming an electrode from said silver containing tungsten carbide.

2. The process of claim 1, wherein the silver salt used is silver metatungstate.

3. The process of claim 2, wherein the electrode is formed by sedimentation of the silver containing tungsten carbide on a diaphragm.

4. The process of claim 2, wherein the electrode is formed by sintering the silver containing tungsten carbide.

5. The process of claim 2, wherein the electrode is formed by pressing the silver containing tungsten carbide.

6. The process of claim 1, wherein the silver containing tungsten carbide is provided with a binder, for the production of the electrode.

7. The process of claim 1, wherein the silver salt of tungstic acid is formed by precipitation of an aqueous solution of a salt of tungstic acid with a silver salt solution.

8. The process of claim 7, wherein silver nitrate is used as the silver salt solution.

9. The process of claim 1, wherein the reduction of the silver salt of tungstic acid is carried out in two steps, the first of said steps is at a temperature between 400° and 600° C. and the second of said steps is at a temperature between 600° and 800° C.

10. The process of claim 9, wherein the reduction is first at 500° and thereafter at 700° C.

11. The process of claim 1, wherein a gaseous carbon containing compound is used as the carburation means at a temperature between 800 and 1000° C.

12. The process of claim 11, wherein CO and $CH_4$ are used as said gaseous carbon containing compounds.

13. The process of claim 12, wherein the carburation temperature is between 830° and 900° C.

References Cited

UNITED STATES PATENTS

| | | | |
|---|---|---|---|
| 3,346,421 | 10/1967 | Thompson | 136—120 |
| 1,984,203 | 12/1934 | Sieger | 75—173 RX |
| 3,508,320 | 4/1970 | Blue | 75—204 X |
| 3,013,875 | 12/1961 | Triffleman | 75—203 X |
| 3,488,291 | 1/1970 | Hardy | 75—204 X |

WINSTON A. DOUGLAS, Primary Examiner

M. J. ANDREWS, Assistant Examiner